US011444785B2

(12) United States Patent
Vaddi et al.

(10) Patent No.: US 11,444,785 B2
(45) Date of Patent: Sep. 13, 2022

(54) ESTABLISHMENT OF TRUSTED COMMUNICATION WITH CONTAINER-BASED SERVICES

(71) Applicant: Hewlett Packard Enterprise Development LP, Houston, TX (US)

(72) Inventors: Kiran Kumar Vaddi, Bangalore Karnataka (IN); Om Kumar, Bangalore Karnataka (IN); Jaivish Kothari, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 590 days.

(21) Appl. No.: 16/293,575

(22) Filed: Mar. 5, 2019

(65) Prior Publication Data

US 2020/0287724 A1   Sep. 10, 2020

(51) Int. Cl.
*H04L 9/32* (2006.01)
(52) U.S. Cl.
CPC ............ *H04L 9/3263* (2013.01); *H04L 9/321* (2013.01); *H04L 2209/64* (2013.01)
(58) Field of Classification Search
CPC .................................................. H04L 9/3263
See application file for complete search history.

(56) References Cited

U.S. PATENT DOCUMENTS

| 7,353,541 | B1* | 4/2008 | Ishibashi | ............ H04N 21/8355 |
| | | | | 726/26 |
| 8,707,027 | B1 | 4/2014 | Naik | |
| 2006/0168451 | A1* | 7/2006 | Ishibashi | ................ G10K 15/02 |
| | | | | 713/176 |
| 2008/0120240 | A1* | 5/2008 | Ginter | ..................... G06F 21/71 |
| | | | | 705/51 |
| 2016/0173488 | A1 | 6/2016 | Xie et al. | |
| 2019/0190931 | A1* | 6/2019 | Levin | ..................... H04L 9/3263 |
| 2019/0347406 | A1* | 11/2019 | Lev-Ran | .................. G06F 21/64 |

OTHER PUBLICATIONS

Allclair, T.; "Managed ca-certs #63726"; May 11, 2018; 5 pages.
Amazon.com; "AWS Certificate Manager"; printed on Oct. 9, 2018 from webpage: https://aws.amazon.com/certificate-manager/; 8 pages.
Honnef, D.; "Managing Let's Encrypt certificates in Kubernetes with kube-cert-manager"; Oct. 7, 2016; 3 pages.
Kubernets; "Manage TLS Certificates in a Cluster"; printed on Oct. 9, 2018 from webpage: https://kubernetes.io/docs/tasks/tls/managing-tls-in-a-cluster/; 7 pages.
Octopef.com; "Rancher 2: Getting Started"; Jun. 4, 2018; 21 pages.
(Continued)

*Primary Examiner* — Simon P Kanaan
(74) *Attorney, Agent, or Firm* — Jaffery Watson Mendonsa & Hamilton

(57) ABSTRACT

Example techniques for establishing trusted communication with container-based services are described. In an example, a digital certificate stored in a memory is injected from the memory into a container. The container is external to the memory. The digital certificate is usable to establish a trusted communication between a service deployed in the container and a software program.

20 Claims, 5 Drawing Sheets

(56) References Cited

OTHER PUBLICATIONS

Openshift.com; "Configuring Custom Certificates"; printed on Oct. 9, 2018 from webpage: https://docs.openshift.com/container-platform/3.7/install_config/certificate_customization.html; 10 pages.
Shah, H.; "Kubernetes: Lifecycle of a Pod"; Aug. 1, 2017; 6 pages.
Karthik Nagesh, "Install Certificates in Alpine Image to establish Secured Communication (SSL/TLS)", available online at <https://hackernoon.com/alpine-docker-image-with-secured-communication-ssl-tls-go-restful-api-128eb6b54f1f>, Sep. 12, 2017, 5 pages.

* cited by examiner

ESTABLISHMENT OF TRUSTED COMMUNICATION WITH CONTAINER-BASED SERVICES

BACKGROUND

Digital certificates, also referred to as certificates, may be used to establish trust between two communicating entities, such as communicating programs. For instance, a service communicating with a software program may receive a certificate of the software program and verify the certificate. A service may refer to a program that may perform one or more specialized operations. Upon verification of the certificate, the service may trust the software program. The service may be deployed in a container, which may be a computing instance that can host the service and can operate as a separate computer from the point of view of the service. Such a service may be referred to as a container-based service.

BRIEF DESCRIPTION OF DRAWINGS

The following detailed description references the figures, wherein.

DETAILED DESCRIPTION

Figure 1:
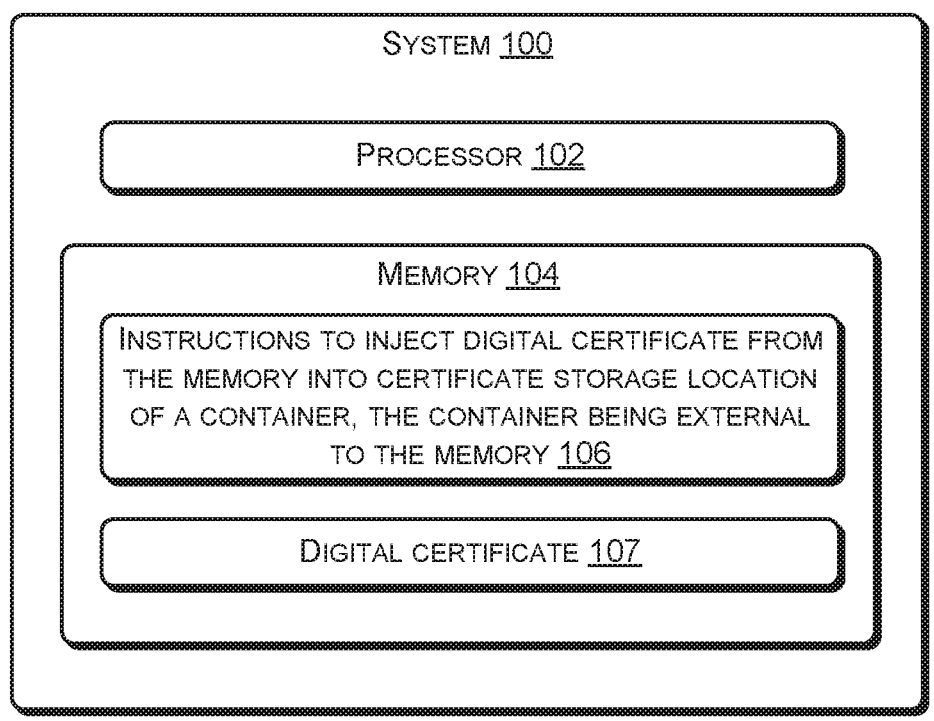
FIG. 1 illustrates a system for facilitating establishment of trusted communication with container-based services, according to an example implementation of the present subject matter.

A container may be defined as a computing instance that can host a service and that can operate as a separate computer from the point of view of the service. The service hosted in the container, also referred to as a container-based service, may have to communicate with a software program. For example, the service may be part of a management solution that can remotely monitor and manage a computing device, the software program may be a software program installed on the computing device to collect performance metrics of the computing device, and the service may receive the performance metrics from the software program.

In some cases, before exchanging information with the software program, the service may have to verify that the software program is trustworthy. For example, the service may have to ensure that the software program is not used by an attacker who may use information provided by the service in a way that would be harmful to a computing environment having the service. To verify trustworthiness of the software program, i.e., to trust the software program, a digital certificate (also referred to as a certificate) may be utilized. For instance, the service may compare a certificate deployed in the container with a certificate presented by the software program, and may decide whether to trust the software program based on the comparison.

Generally, deployment of a certificate in a container involves manual intervention. For example, the certificate may have to be exposed by a user to the container using a configuration map (also referred to as a config map), or may have to be mounted by the user on a volume associated with the container. Further, if a certificate is to be deployed in a container after initialization of the container, the container may have to be redeployed. Thus, deployment of certificates in containers may be laborious, time-consuming, and inefficient.

The present subject matter relates to establishment of trusted communication with container-based services. With the implementations of the present subject matter, certificates may be deployed in containers in an efficient and automated manner. Further, the certificates may be deployed in the container without redeploying the container, while the container is running.

In accordance with an example implementation, a system may inject a digital certificate, also referred to as a certificate, stored in a memory of the system from the memory into a certificate storage location of a container. The container may be external to the memory. For example, the container may be hosted in a computing system different the system.

The memory may act as a repository of up-to-date and valid certificates. The certificate can be used to establish a trusted communication between a service deployed in the container and a software program. For instance, the certificate may be compared with a certificate presented by the software program to determine whether the software program can be trusted. Further, the certificate storage location may be a location in the container designated for storing certificates. For instance, the certificate storage location may be a location that is to be accessed by the service for retrieving certificates.

In an example, the injection of the certificate may be performed in response to initialization of the container. Further, in an example, the system may inject certificate in response to update of the certificate in the memory of the system. For instance, if the memory is updated with the certificate, such as due to expiry or revocation of an older certificate, the updated certificate may be injected into the container.

The present subject matter provides an automated technique for deployment of certificates into containers. Also, the present subject matter facilitates injection of a certificate directly into the container from outside of the container. Therefore, the usage of config map, volumes, and the like for deploying a certificate into the container can be eliminated. Further, the injection of the certificates into the certificate storage location helps in utilization of the certificate without redeployment of the container. For instance, upon injection of the certificate, the service deployed in the container can retrieve the certificate from the certificate storage location and use the certificate for determining whether a software program can be trusted.

The injection of certificates in response to initialization of a container ensures that a container has all certificates that can be used for establishing trusted communications before a service becomes operational. Further, the injection of a certificate in response to updating of the memory with the certificate ensures that the container possesses valid and up-to-date certificates. For example, a container may be injected with a new certificate that is updated in the memory due to expiry or revocation of an older certificate.

Since the present subject matter enables injection of certificates even after initialization of containers, the certificates may not have to be bundled with container images, from which containers are created. Therefore, the present subject matter can be used to establish trusted communications using certificates issued by private certification authorities (CAs), which are generally not bundled with container images. Accordingly, the present subject matter can be used in on-premises (on-prem) clusters, which generally use certificates issued by private CAs for establishing trusted communications.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

FIG. 1 illustrates a system 100 for facilitating establishment of trusted communication with container-based services, according to an example implementation of the present subject matter. The system 100 may be implemented as any of a variety of computing systems, such as a desktop computer, a laptop computer, a server, and the like. The system 100 includes a processor 102 and a memory 104 coupled to the processor 102.

The processor 102 may be implemented as microprocessors, microcomputers, microcontrollers, digital signal processors, central processing units, state machines, logic circuitries, and/or any devices that manipulate signals based on operational instructions. Among other capabilities, the processor 102 may fetch and execute computer-readable instructions included in the memory 104. The computer-readable instructions, hereinafter referred to as instructions, includes instructions 106. The functions of the processor 102 may be provided through the use of dedicated hardware as well as hardware capable of executing machine readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the system 100 may also include interface(s) and system data (not shown in FIG. 1). The interface(s) may include a variety of machine readable instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In operation, the memory 104 may store digital certificates, such as a digital certificate 107, also referred to as certificates. The memory 104 may act as a repository for valid and up-to-date certificates. A certificate can be used to establish trusted communication between a software program and a service deployed in a container (not shown in FIG. 1). The container may be external to the memory 104. For example, the container may be deployed in a system other than the system 100.

The establishment of trust using the certificate will be explained with reference to FIG. 2. A container may be defined as a computing instance that can host a service and operates as a separate computer from the point of view of the service. The container will be explained in greater detail with reference to FIG. 2.

The instructions 106, when executed by the processor 102, enable injection of the certificate 107 from the memory 104 into a certificate storage location (CSL) of the container. Here, injection of a certificate into a container may refer to writing the certificate into a storage region within the container. The certificate storage location may be a location in the container that is designated for storing digital certificates. The details of the injection and the certificate storage location will be explained in greater detail in the subsequent paragraphs.

Figure 2:
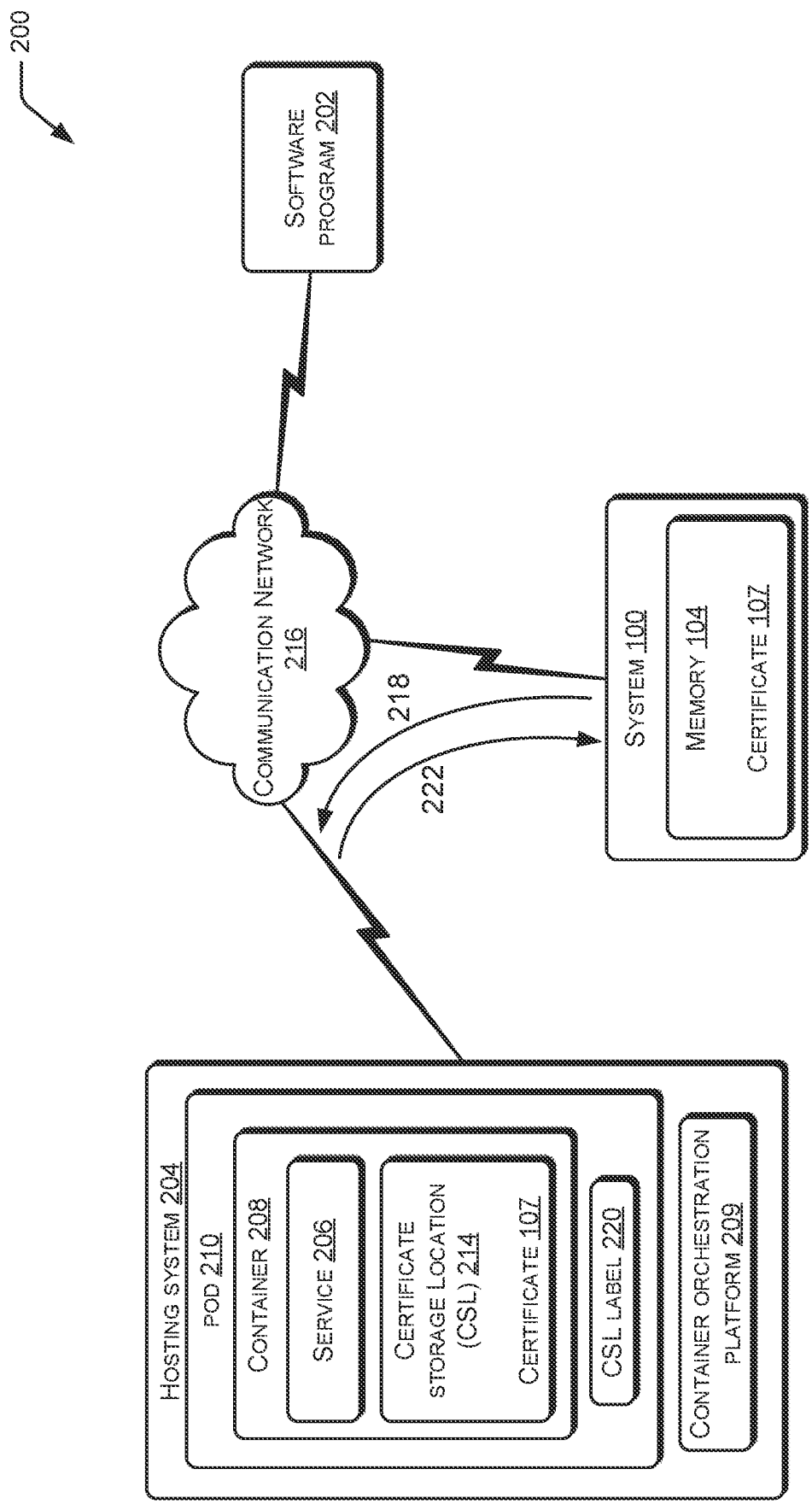
FIG. 2 illustrates a computing environment in which trusted communication is to be established between a software program and a container-based service, according to an example implementation of the present subject matter.

FIG. 2 illustrates a computing environment 200 in which trusted communication is to be established between a software program 202 and a container-based service, according to an example implementation of the present subject matter. As illustrated, the computing environment 200 includes a hosting system 204. The hosting system 204 may be, for example, a computing node or a cluster of computing nodes, also referred to as a cluster. A computing node, also referred to as a node, may be a computing device (e.g., a personal computer, a laptop, or a desktop) or a Virtual Machine (VM) running on a computing device. The cluster may refer to a set of nodes which have their resources, such as storage, processor, and memory, managed together.

The hosting system 204 may be utilized for hosting one or more services, such as a service 206. A service may refer to a program that may perform one or more specialized operations. Examples of the service are a user interface (UI), a backend Application Programming Interface (API) service, service, and an authentication service. The UI service may provide options for graphical interactions with a user. The API service may process the request from the user and provide a response based on a functionality provided by the service or by an application that the service is part of. The authentication service may authenticate and authorize the validity of the user to perform requests and to use the application.

In an example, the service 206 may be a container-based service, i.e., hosted in a container, such as a container 208. The container 208, in turn, may be hosted in the hosting system 204. A container may refer to a computing instance that can host a service and operates as a separate computer from the point of view of the service. For instance, the container can isolate the service running within itself from a computing node the container is hosted in and from other containers hosted in the computing node. The container may provide, among other things, code, runtime, system tools, system libraries, and settings to the service. Further, the container can provide a consistent runtime environment to the service regardless of the node it is hosted in.

In an example, the service 206 may be part of an application (not shown in FIG. 2) including several services. An example application may be a management application that can remotely monitor and manage a plurality of computing devices. Such an application may include a UI service, a backend API service, and an authentication service. The deployment of a larger application in the form of several smaller and loosely-coupled services, as explained herein, may be referred to as a microservice architecture. The containers hosting services that are part of the application may be managed by a container orchestration platform 209, which may be, for example, Kubernetes®. The container orchestration platform 209 may run on, for example, the hosting system 204.

In an example, the container 208 may be part of a pod 210, which may be the smallest functional unit that can be managed, i.e., created, deployed, and deleted, by the container orchestration platform 209. The pod 210 may encapsulate the container 208, storage resources, an Internet Protocol (IP) address, and options that govern how the container 208 should run. Although not illustrated, the pod 210 may include one or more containers other than the container 208. The pod 210 may be deployed in the hosting system 204. In case the hosting system 204 is a cluster, the pod 210 may be deployed in a node of the cluster.

In some cases, a container-based service may have to communicate with a software program. For example, the software program 202 may be an application or a firmware installed on a computing device (not shown in FIG. 2) for monitoring performance metrics of the computing device and for reporting the performance metrics to a cloud-based analytics application, and the service 206 may be part of the analytics application. Accordingly, the performance metrics sent by the software program 202 may be received by the service 206. To communicate with the software program 202, the service 206 may have to verify the trustworthiness of the software program 202. For instance, the service 206 may have to ensure that the software program 202 is not used by an attacker who can misuse the information provided by the service 206 or provide misleading information to the service 206.

A technique that can be used to verify trustworthiness of the software program 202 involves the use of digital certificates, also referred to as certificates. In accordance with the technique, the software program 202 may present to the service 206 a first certificate issued to the software program 202 or to a device running the software program 202 by an entity trusted by the service 206 ("trusted authority"). The trusted authority may also be referred to as a certification authority (CA). A CA may be a public CA, which may be widely trusted by several entities on the internet, or may be a private CA, which may be a CA for a particular organization or a group of organizations. In an example, the private CA may belong to an organization that manages (e.g., develop, deploy, and update) the service 206 and the software program 202.

The trusted authority may have issued the first certificate using a second certificate that belongs to the trusted authority. The second certificate may be a self-signed certificate. A self-signed certificate is a certificate signed by the same entity (in this case, the trusted authority) whose identity it certifies. For example, the second certificate may be a root certificate, which may be a certificate issued to the trusted authority by the trusted authority itself, and may identify the trusted authority. In an example, the second certificate may be the certificate 107.

To verify whether the first certificate was issued by the trusted authority, in an example, the service 206 may access a copy of the second certificate and compare the second certificate with the first certificate. For instance, the service 206 may determine whether the first certificate was issued by the trusted authority using the second certificate. If, based on the comparison, the service 206 determines that the first certificate was issued by the trusted authority, the service 206 may begin trusting the software program 202, and may begin exchanging information with the software program 202. Thus, a trusted communication may be established between the service 206 and the software program 202. In an example, the communication between the service 206 and the software program 202 may utilize a Hyper Text Transfer Protocol Secure (HTTPS) protocol.

Since the service 206 is hosted in the container 208, to enable the service 206 to access the second certificate, the second certificate may have to be stored in the container 208. The storage of the second certificate in the container 208, in accordance with the present subject matter, will be explained below. In the below explanation, the second certificate may be referred to as the certificate 107.

The present subject matter injects the certificate 107 into the container 208. The injection of a certificate into a container may refer to writing the certificate into a storage region within the container. In an example, the certificate 107 may be injected into a location of the container 208 that is designated for storage of certificates. For instance, the location may be a location that is to be accessed by the service 206 for retrieving certificates. The location designated for storage of the certificates may be referred to as a certificate storage location (CSL) 214 of the container 208. In an example, the CSL of a container may be specified by an operating system of the container and a service running in the container.

The injection of the certificate 107 may be performed by the system 100, as mentioned earlier. In an example, as illustrated, the system 100 may be different from the hosting system 204, which hosts the container 208, and may be connected to the hosting system 204 through a communication network 216.

The communication network 216 may be a wireless or a wired network, or a combination thereof. The communication network 216 may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 216 includes various network entities, such as transceivers, gateways, and routers.

To determine the CSL 214, in an example, the system 100 may utilize a CSL label 220 of the pod 210. A label may be a key-value pair attached to a pod identifying attributes of the pod that are meaningful and relevant to users of the pod. A label may be attached to the pod at the time of its creation or may be subsequently added and modified. In some examples, the CSL 214 may be /etc/ssl/certs, /etc/ssl, or /usr/local/share/ca-certificates.

To inject the certificate 107 into the container 208, the system 100 may send an injection command and the certificate 107 to the hosting system 204. In an example, the injection command may be sent to the container orchestration platform 209. The injection command may be a command usable to access the container 208 from outside of the container 208. Such a command may be specified by a platform that manages lifecycle of the container 208, such as the container orchestration platform 209. If the container orchestration platform 209 is Kubernetes®, in an example, the injection command may be a kubectl exec command. The injection command may specify the name of the pod 210, which hosts the container 208, and the CSL 214, so that the certificate 107 can be injected into the CSL 214 of the container hosted in the pod 210. The name of the pod 210 may be provided by the container orchestration platform 209.

In an example, the system 100 may inject the certificate 107 into the CSL 214 in response to initialization of the container 208. To ensure that the certificate 107 is injected upon initialization of the container 208, the system 100 may receive an event indicating creation of the pod 210. The event indicating creation of a pod may be referred to as a pod creation event. In an example, the pod creation event may be generated by the container orchestration platform 209 running on the hosting system 204, when the container orchestration platform 209 creates the pod 210. The receipt of the pod creation event by the system 100 is depicted by an arrow 222. In an example, the container orchestration platform 209 may create the pod 210 upon receiving a request from a user to create a pod. Upon receiving the pod creation event, the system 100 may determine the number of containers in the pod 210. Further, the system may determine the CSL 214 based on the CSL label 220. Based on the aforesaid determinations, the system 100 may inject the certificate 107 into the CSL of each container that is part of the pod 210. The injection of the certificate 107 into the CSL 214 is depicted by an arrow 218.

The injection of the certificate 107 in response to receiving the pod creation event automates the process of certificate injection into the containers. Also, the certificate 107 may be injected into the container 208 when the container 208 is initialized. Further, the injection of the certificate 107 into the CSL 214 ensures that the service 206 can readily access the certificate 107 upon injection of the certificate 107. Therefore, the present subject matter enables container-based services to establish trusted communications with minimal delay.

Although the trust establishment is explained with reference to a single certificate (the certificate 107), in an example, several certificates can be injected. For example, different software programs may use certificates issued by different trusted entities and may present such certificates to the services they are to communicate with. Accordingly, the memory 104 may store certificates (e.g., root certificates) of all such trusted entities and, upon receiving a pod creation event, may inject all such certificates into the containers of the created pod. Therefore, the present subject matter can be utilized to establish trusted communication with a wide variety of software programs.

Figure 3:
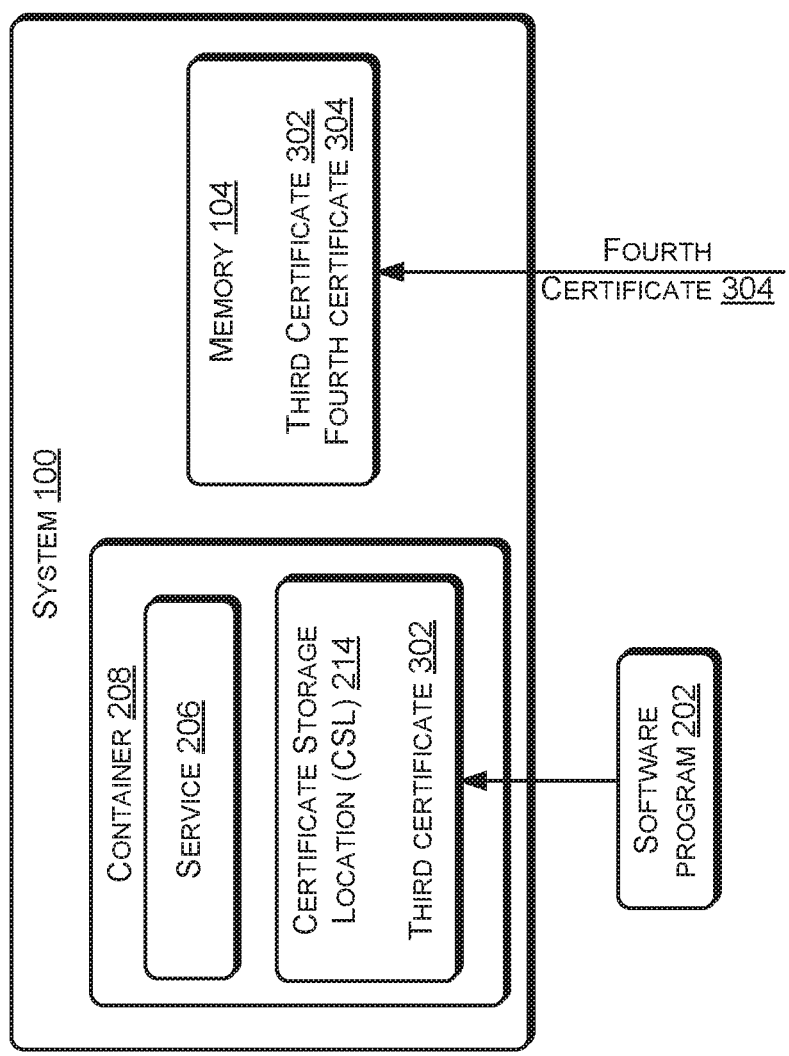
FIG. 3 illustrates a system for facilitating establishment of trusted communication with container-based services, according to an example implementation of the present subject matter.

FIG. 3 illustrates the system 100 facilitating establishment of trusted communication with container-based services, according to an example implementation of the present subject matter. As illustrated, the system 100 may host the container 208. In an example, the system 100 may be implemented as a computing device that hosts the container 208 and that also has the memory 104. The container 208 may be hosted directly in the computing device or in a VM hosted in the computing device. Even in such a case, the container 208 may be external to the memory 104. In another example, the system 100 may be implemented as a cluster, with the container 208 hosted in one node of the cluster and the memory 104 being part of another node of the cluster.

In addition to injecting certificates, such as a third certificate 302, upon receiving a pod creation event, the system 100 may inject certificates, such as a fourth certificate 304, upon satisfaction of other conditions as well. For instance, the system 100 may inject the fourth certificate 304 into the container 208 when it detects that the memory 104 is updated with the fourth certificate 304. The memory 104 may be updated with the fourth certificate 304, for example, when the third certificate 302, which is already stored in the memory 104, has expired, is about to expire, or is revoked by the trusted authority to which it belongs. In such a case, the fourth certificate 304 may be a new certificate of the trusted authority. In another example, the fourth certificate 304 may be a certificate of another trusted authority that uses the fourth certificate 304 to issue other certificates. The fourth certificate 304 may be received, for example, from the trusted authority to which the fourth certificate 304 belongs. The fourth certificate 304 may be injected into the container 208. To inject the fourth certificate 304 into the container 208, in an example, the system 100 may utilize the injection command. In response to the injection of the fourth certificate 304, the service 206 can establish trusted communication with a software program, such as the software program 202, based on the fourth certificate 304.

The injection of certificates in response to updating of the memory 104 makes injection of certificates into containers a dynamic process. This also ensures that the containers remain up-to-date with all certificates that are to be used for establishing trusted communications.

It is to be noted that the injection of the certificates in response to the memory 104 getting updated, as explained above, may be performed even after initialization of the container 208, and during runtime of the container 208. Further, the container 208 may not have to be redeployed after injection of a certificate for utilizing the certificate. The redeployment of the container 208 is prevented, for example, due to injection of the certificate directly into the CSL 214 of the container 208, as the service 206 can readily access the injected certificate from the CSL 214 and verify a certificate presented by a software program. Thus, the present subject matter makes the certificate injection process considerably quicker and more efficient.

In an example, the node in which the container 208 is deployed, may host other containers as well. In such a case, the system 100 may inject certificates into the other containers as well, for example, in response to their initialization or in response to the memory 104 getting updated. Similarly, as mentioned earlier, the node in which the container 208 is deployed may be part of a cluster, and each node of the cluster may host containers. Accordingly, the system 100 may inject certificates into several containers of the cluster. A certificate may be injected into the containers that host services that are to use the certificate for establishing trusted communication.

Although, in the description of FIG. 3, the injection of certificates upon updating of the memory 104 is explained with reference to a scenario in which the system 100 hosts the containers, the injection of certificates upon updating of the memory 104 may be performed even when the system 100 does not host the containers. For instance, in response to the memory getting updated, the injection may be performed into a container that is hosted in a node connected to the system 100 over a communication network, such as the communication network 216.

Figure 4:
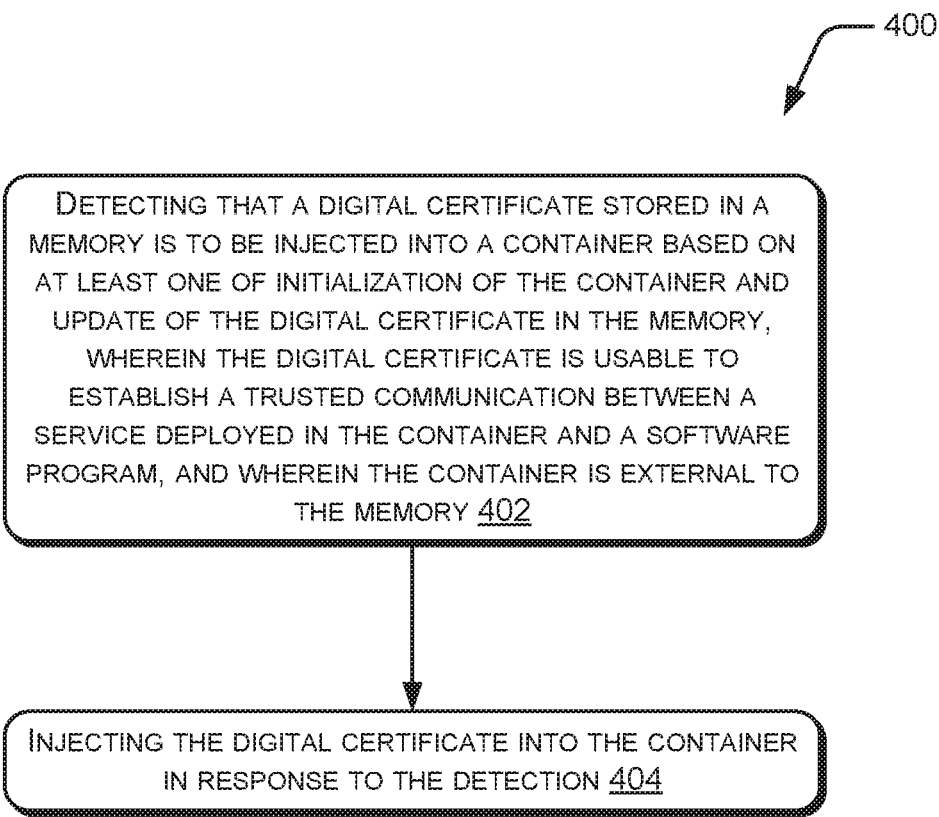
FIG. 4 illustrates a method for facilitating establishment of trusted communication with container-based services, according to an example implementation of the present subject matter.

FIG. 4 illustrates a method 400 for facilitating establishment of trusted communication with container-based services, according to an example implementation of the present subject matter.

The order in which the method 400 is described is not intended to be construed as a limitation, and any number of the described method blocks may be combined in any order to implement the method 400, or an alternative method. Furthermore, the method 400 may be implemented by processing resource(s) or computing device(s) through any suitable hardware, non-transitory machine-readable instructions, or a combination thereof.

It may be understood that steps of the method 400 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the method 400 may be implemented in a variety of systems, the method 400 is described in relation to the aforementioned system 100, for ease of explanation. In an example, the method 400 may be performed by a processing resource, such as the processor 102.

At block 402, a detection is made that a digital certificate stored in a memory is to be injected into a container. The digital certificate is usable to establish a trusted communication between a service deployed in the container and a software program. The digital certificate may also be referred to as a certificate and may be, for example, the certificate 107, the third certificate 302, or the fourth certificate 304. The certificate may be a self-signed certificate, and may be issued by a private certification authority (CA). Further, the memory may be the memory 104, the container may be the container 208, the service may be the service 206, and the software program may be the software program 202. The container may be external to the memory.

The detection may be made based on initialization of the container. In an example, the method 400 includes detecting initialization of the container based on a pod creation event, as explained with reference to FIG. 2. The pod creation event may indicate initialization of a pod, such as the pod 210, having the container. The detection that the certificate is to be injected may also be made based update of the digital certificate in the memory, as explained with reference to FIG. 3.

In response to the detection, at block 404, the certificate may be injected from the memory into the container. In an example, when the injection is performed based on the pod creation event, the method 400 may include determining the number of containers in the pod and injecting the digital certificate into each container in the pod.

In an example, the certificate may be injected into a certificate storage location (CSL) of the container. The CSL may be a location in the container designated for storing digital certificates and may have to be accessed by the service to retrieve certificates. The CSL may be, for example, the CSL 214. The CSL may be determined based on a CSL label of a pod including the container. The CSL label may be, for example, the CSL label 220, and the pod may be, for example, the pod 210.

The injection into the CSL may include sending an injection command to a hosting system, such as the hosting system 204, hosting the container. The injection command may be sent to a container orchestration platform, such as the container orchestration platform 209, running on the hosting system. The injection command may specify a name of a pod having the container and the CSL.

Figure 5:
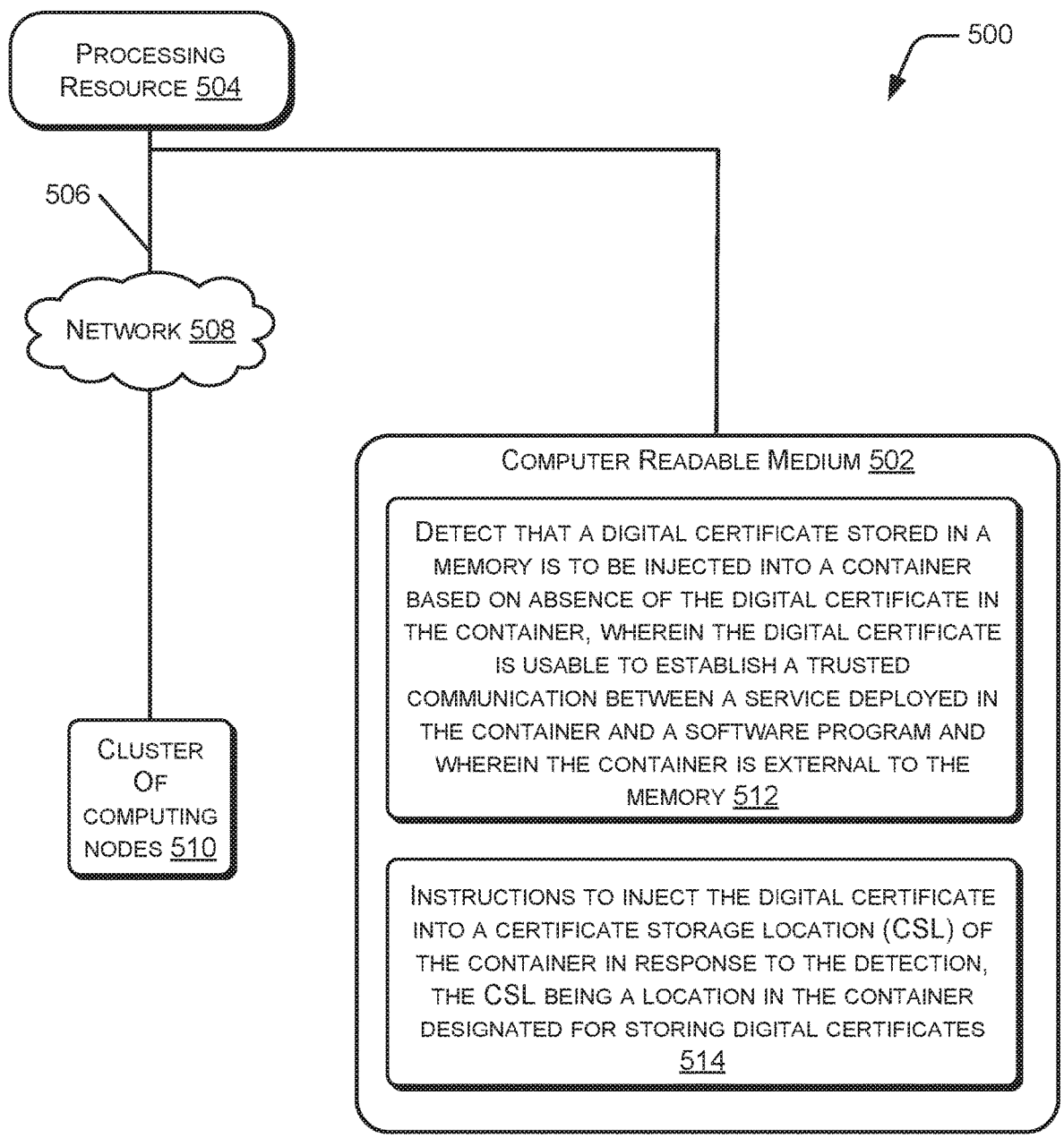
FIG. 5 illustrates a computing environment, implementing a non-transitory computer-readable medium for facilitating establishment of trusted communication with container-based services, according to an example implementation of the present subject matter.

FIG. 5 illustrates a computing environment 500, implementing a non-transitory computer-readable medium 502 for facilitating establishment of trusted communication with a container-based service, according to an example implementation of the present subject matter.

In an example, the non-transitory computer-readable medium 502 may be utilized by a system, such as the system 100. The system 100 may be implemented in a public networking environment or a private networking environment. In an example, the computing environment 500 may include a processing resource 504 communicatively coupled to the non-transitory computer-readable medium 502 through a communication link 506.

In an example, the processing resource 504 may be implemented in a system, such as the system 100. The processing resource 504 may be the processor 102. The non-transitory computer-readable medium 502 may be, for example, an internal memory device or an external memory device. In one implementation, the communication link 506 may be a direct communication link, such as any memory read/write interface. In another implementation, the communication link 506 may be an indirect communication link, such as a network interface. In such a case, the processing resource 504 may access the non-transitory computer-readable medium 502 through a network 508. The network 508 may be a single network or a combination of multiple networks and may use a variety of different communication protocols.

The processing resource 504 and the non-transitory computer-readable medium 502 may also be communicatively coupled to a cluster of computing nodes 510 over the network 508. The cluster of computing nodes may have several computing nodes that host container-based services.

In an example implementation, the non-transitory computer-readable medium 502 includes a set of computer-readable instructions to facilitate establishment of trusted communication with a container-based service. The set of computer-readable instructions can be accessed by the processing resource 504 through the communication link 506 and subsequently executed.

Referring to FIG. 5, in an example, the non-transitory computer-readable medium 502 includes instructions 512 that cause the processing resource 504 to detect that a digital certificate stored in a memory is to be injected into the container. The digital certificate can be used to establish a trusted communication between a service deployed in the container and a software program. The digital certificate may be referred to as the certificate and may be, for example, the certificate 107, the third certificate 302, or the fourth certificate 304. The certificate may be a self-signed certificate, and may belong to a private certification authority (CA). Further, the memory may be the memory 104, the container may be the container 208, and the service may be the service 206. The container may be external to the memory.

The processing resource 504 may detect the certificate is to be injected based on absence of the certificate in the container. The absence of the certificate may, in turn, be detected in response to receiving an event indicating initialization of the container. The event may be, for example, the pod creation event explained with reference to FIG. 3. For instance, when the container has just been initialized, the processing resource 504 may infer that the container is unlikely to have the certificate. The processing resource 504 may detect the absence of the digital certificate in the container also in response to updating of the certificate in a memory that is to store certificates. For instance, when a new certificate has just been written to the memory, the processing resource 504 may determine that the new certificate is unlikely to be present in the container.

The non-transitory computer-readable medium 502 includes instructions 514 that cause the processing resource 504 to inject the digital certificate into a certificate storage location (CSL) of the container in response to the detection. The CSL may be a location in the container designated for storing digital certificates. For instance, the CSL may be a location to be accessed by the service to retrieve certificates.

The CSL may be, for example, the CSL 214. The instructions 514 may enable determining the CSL based on a CSL label, such as the CSL label 220, of a pod, such as the pod 210, including the container.

The present subject matter provides an automated technique for deployment of certificates into containers. The techniques of the present subject matter can inject certificates directly into the containers from outside of the containers. Therefore, the certificates are not to be exposed to the containers through configuration map or stored in volumes associated with the containers. Thus, the manual intervention involved in the deployment of certificates is significantly reduced. Further, the injection of the certificates into the certificate storage location ensures that the container is not to be redeployed for utilizing the certificates.

The injection of certificates in response to initialization of a container ensures that a container has all certificates that are to be used for establishing trusted communications before a service deployed in the container becomes operational. Further, the injection of a certificate in response to updating of the memory with the certificate ensures that the container possesses valid and up-to-date certificates. For example, a container may be injected with a new certificate that is updated in the memory due to expiry or revocation of an older certificate.

Since the present subject matter enables injection of certificates even after initialization of containers, the certificates are not to be bundled with container images, from which containers are created. Therefore, the present subject matter can be used to establish trusted communications using certificates issued by private certification authorities (CAs), which are generally not bundled with container images. Accordingly, the present subject matter can be used in on-premises (on-prem) clusters, which generally use certificates issued by private CAs for establishing trusted communications.

Although implementations of establishment of trusted communication with container-based services have been described in language specific to structural features and/or methods, it is to be understood that the present subject matter is not necessarily limited to the specific features or methods described. Rather, the specific features and methods are disclosed and explained as example implementations.

We claim:

1. A system comprising:
a processor; and
a memory coupled to the processor, wherein the memory is to store a digital certificate, the digital certificate is usable to establish a trusted communication between a service deployed in a container and a software program before the service becomes operational, the container is a computing instance that hosts the service and operates as a separate computer from the point of view of the service and is external to the memory, and the memory comprises instructions executable by the processor to:
inject the digital certificate from the memory into a certificate storage location (CSL) of the container based on a CSL label of a corresponding pod, the CSL label being attached to the pod and based on identifying attributes of the pod, wherein the CSL indicates a location in the container designated for storing digital certificates.

2. The system of claim 1, wherein the instructions are executable to inject the digital certificate into the container in response to initialization of the container.

3. The system of claim 2, wherein to inject the digital certificate into the container in response to initialization of the container, the instructions are executable by the processor to:
receive a pod creation event indicating initialization of the pod corresponding to the container;
determine a number of containers in the pod; and
inject the digital certificate into each container in the pod.

4. The system of claim 1, wherein the instructions are executable to:
detect that the memory is updated with the digital certificate; and
inject the digital certificate into the container in response to the detection.

5. The system of claim 4, wherein, to inject the digital certificate into the CSL of the container, the instructions are executable to send an injection command to a hosting system hosting the container, the injection command specifying a name of the pod corresponding to the container and the CSL.

6. The system of claim 1, wherein the CSL is to be accessed by the service to retrieve digital certificates.

7. The system of claim 6, wherein the instructions are executable to determine the CSL based on the CSL label of the pod corresponding to the container.

8. The system of claim 1, wherein the digital certificate is a self-signed digital certificate.

9. A method comprising:
detecting, by a processing resource, that a digital certificate stored in a memory is to be injected into a container based on at least one of initialization of the container and update of the digital certificate in the memory, wherein the digital certificate is usable to establish a trusted communication between a service deployed in the container and a software program before the service becomes operational, and wherein the container is a computing instance that hosts the service and operates as a separate computer from the point of view of the service and is external to the memory; and
injecting, by the processing resource, the digital certificate from the memory into the container in response to the detection based on a digital certificate label of a corresponding pod hosting the container, wherein the pod encapsulates at least the container, storage resources, an address, and options that govern how the container runs.

10. The method of claim 9, comprising injecting the digital certificate into a certificate storage location (CSL) of the container, wherein
the CSL is a location in the container designated for storing digital certificates, and
the CSL is to be accessed by the service to retrieve digital certificates.

11. The method of claim 10, comprising determining the CSL based on a CSL label of the corresponding pod.

12. The method of claim 9, comprising:
detecting initialization of the container based on a pod creation event, the pod creation event indicating initialization of the corresponding pod,
and wherein injecting the digital certificate into the container comprises:
determining a number of containers in the pod; and
injecting the digital certificate into each container in the pod.

13. The method of claim 9, wherein the digital certificate is a self-signed digital certificate.

14. The method of claim 10, wherein injection of the digital certificate into the CSL comprises sending an injection command to a hosting system hosting the container, the injection command specifying a name of the corresponding pod and the CSL.

15. A non-transitory computer-readable medium comprising instructions for facilitating trusted communication establishment with a container-based service, the instructions being executable by a processing resource to:
- detect that a digital certificate stored in a memory is to be injected into the container based on absence of the digital certificate in the container, wherein the digital certificate is usable to establish a trusted communication between a service deployed in the container and a software program before the service becomes operational, and wherein the container is a computing instance that hosts the service and operates as a separate computer from the point of view of the service and is external to the memory; and
- inject the digital certificate from the memory into the container in response to the detection based on a digital certificate label of a corresponding pod hosting the container, wherein the pod encapsulates at least the container, storage resources, an address, and options that govern how the container runs.

16. The non-transitory computer-readable medium of claim 15, wherein the instructions are executable by the processing resource to:
- detect the absence of the digital certificate in the container in response to receiving an event indicating initialization of the container.

17. The non-transitory computer-readable medium of claim 15, wherein the instructions are executable by the processing resource to:
- detect the absence of the digital certificate in the container in response to updating of the digital certificate in a memory that is to store digital certificates.

18. The non-transitory computer-readable medium of claim 15, wherein the instructions are executable by the processing resource to determine the CSL based on the digital certificate label of the corresponding pod.

19. The non-transitory computer-readable medium of claim 15, wherein the digital certificate is a self-signed digital certificate of a private certification authority (CA).

20. The non-transitory computer-readable medium of claim 15, wherein the CSL is to be accessed by the service to retrieve digital certificates.

* * * * *